Jan. 18, 1949.  C. K. STILLWAGON  2,459,251
THREADLESS PIPE COUPLING
Filed June 30, 1945

Inventor
Crawford K. Stillwagon
By E. V. Hardway
Attorney

Patented Jan. 18, 1949

2,459,251

UNITED STATES PATENT OFFICE 2,459,251

THREADLESS PIPE COUPLING

Crawford K. Stillwagon, Houston, Tex., assignor to Well Equipment Mfg. Corp., Houston, Tex., a corporation of Texas Application June 30, 1945, Serial No. 602,560

5 Claims. (Cl. 285—194)

This invention relates to a threadless pipe coupling.

An object of the invention is to provide a coupling of the character described whereby the adjacent ends of pipes or other cylindrical objects may be quickly connected or disconnected.

The present invention embodies certain improvements over the subject matter disclosed in my co-pending application for Pipe coupling, filed February 14, 1944, under Serial No. 522,331, now Patent No. 2,449,795, and my co-pending application for Pipe coupling filed July 5, 1944, under Serial No. 538,823, now abandoned, the improvements herein described being directed more particularly to a novel means of gripping and securely holding the ends of the pipes or other cylindrical objects to be connected.

Another object of the invention is to provide a plurality, preferably two sections of the coupling housing connected together so that they may be readily applied to or disconnected from the objects to be connected with a series of engaging dogs assembled in the respective housing sections and engageable with the ends of the connected objects and mount, in a novel manner, in said sections.

It is further object of the invention to provide a coupling of the character described in which all of the parts are held together so as to form a single unit for convenience in use.

The cupling is specially intended for making temporary connections, although it is suitable for general and permanent use.

Other and further objects of the invention will be apparent from the following specifications which is illustrated by the accompanying drawing, wherein—

Figure 1:
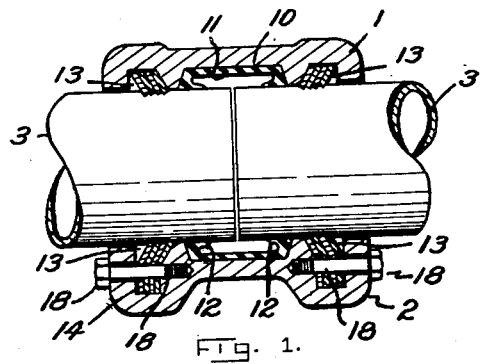
Figure 1 is a longitudinal, sectional view of the coupling as applied to the adjacent ends of the pipe sections.
Figure 2:
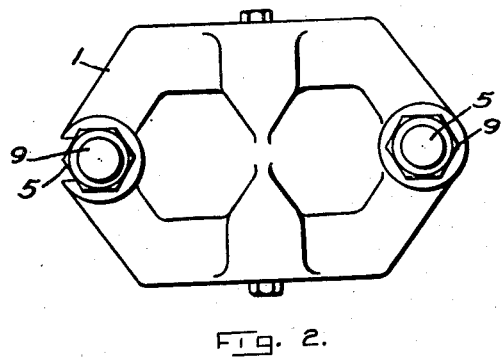
Figure 2 is a top, plan view.

Referring now more particularly to the drawings, the numerals 1 and 2 designate the sections of the coupling housing. They are of arcuate inside formation to fit around adjacent ends of pipe sections 3, 3, as shown in Figure 1.

Figure 3:
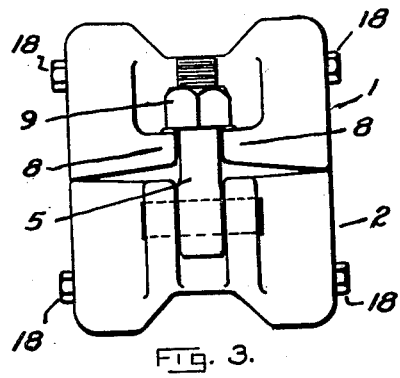
Figure 3 is an end view showing the coupling in closed position.
Figure 4:
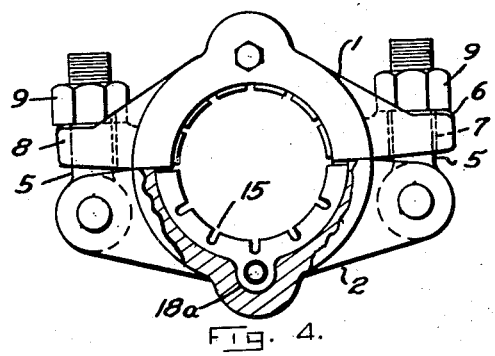
Figure 4 is an end view partly in section.

The section 2 has the outwardly extended ends 4, 4 to which the outwardly threaded bolts 5, 5 are pivoted. The section 1 has the outwardly extended lug 6, at one end, provided with an opening 7 therethrough through which one of the bolts 5 is extended and, at its other end, the section 1 has spaced outwardly extended lugs 8, 8 spaced a sufficient distance apart to receive the other bolt 5, as shown in Figures 3 and 4.

Screwed on to the bolts 5 are the nuts 9, 9.

The housing has an inside, annular groove 10 to snugly receive an annular gasket, or seal ring, 11. This seal ring is formed of rubber or other resilient material and has the inside, inwardly directed annular lips 12, 12 which fit closely around the opposing ends of the pipe sections and form fluid tight seals therewith.

On opposite sides of the groove 10 each housing section has an inside arcuate groove 13. The grooves 13 of one section aligns with the corresponding grooves 13 of the other section. The inner side of each groove 13 is flared inwardly with respect to the outer side of said groove, as shown in Figure 1.

Figure 5:
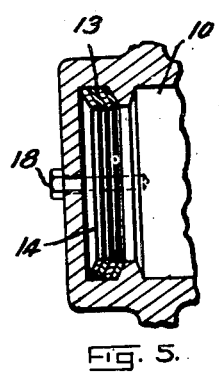
Figure 5 is a fragmentary, sectional view.

In each groove 13 there is an assembly of arcuate plate like dogs 14. The dogs of each series are nested together, as shown in Figures 1 and 5. They are similar in shape and follow the contour of the inner side of the groove 13 in which they are located. In other words the series of dogs, at one end, of a coupling section converges inwardly with respect to the series of dogs at the other end of said section.

The dogs are curved so as to conform to the contour of the sections of pipe surrounded by them. The inner margins of the dogs 14 may, if desired, be provided with the spaced notches 15 for a better gripping effect on the pipe and so that said dogs may more readily yield to fit the contour of the pipe.

Figure 6:
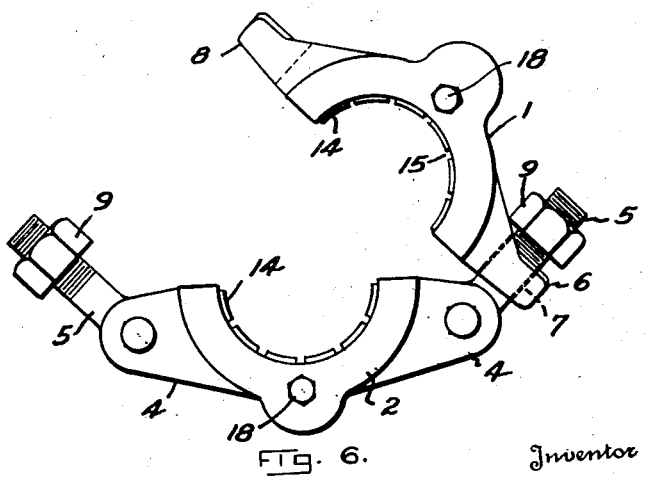
Figure 6 is an end view showing the coupling in open position.
Figures 7, 8:
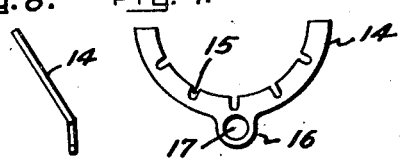
Figure 7 is an elevational view of one of the engaging dogs employed.
Figure 8 is an edge view thereof.

The outer margins of the dogs of each series have the outwardly extended lugs 16 provided with the bolt holes 17 which align and the sections of the coupling have correspondinly shaped recesses 18a into which said lugs fit and there are the bolts 18 which are fitted inwardly through the ends of the coupling sections, through the bolt holes 17, and whose inner ends are threaded into the respective sections. These bolts fit through the bolt holes 17 loosely so that the dogs 14 will have the required range of movement. In application to the pipe the nuts 9 are screwed outwardly the required distance, as shown in Figure 6; the gasket 11 is applied around the opposed ends of the pipe sections to be connected and the section 2 is then fitted to the gasket. The section 1, in the present illustration, has sufficient freedom of movement so that it may be readily fitted over the gasket without distorting the gasket and both nuts, 9, 9 may then be screwed home to the position shown in Figure 4 so that the pressure will be equally applied on both sides of the gasket so as to secure a uniform close fitting seal all around the pipe ends.

The inner margins of the dogs 14 will be in engagement with the pipe ends. Should the pipe sections 3, 3 tend to move apart, the dogs, or gripping elements, 14 will tilt outwardly and thus bite deeper into said pipe sections and will firmly grip and hold the sections against separation.

Any fluid flowing through the connected pipe and leaking between the adjacent ends of the sections will flow into the space in the seal ring between the lips 12 and the pressure will force said lips closely against the pipe ends to prevent leakage of the fluid.

The drawings and description are illustrative merely while the broad principle of the invention will be defined by the appended claims.

What I claim is:

1. A coupling for a rod or pipe joint comprising, a housing formed of longitudinal sections and shaped to surround the adjacent ends of the rod or pipe, an annular packing around said ends and countersunk into the housing, inside, annular, grooves in the housing on opposite sides of the packing, series of nested, arcuate, dogs in said grooves around, and in engagement with, said adjacent ends of the rod or pipe and means for connecting said dogs, loosely, to the corresponding housing sections, and means for pivotally connecting and disconnecting said housing sections so as to form a single unit.

2. A coupling for the adjacent ends of a rod or pipe comprising, a housing formed of two sections shaped to closely surround said adjacent ends, said housing having inside, annular grooves formed with recesses, arcuate, plate-like dogs nested in the grooves and shaped to fit around, and engage, said adjacent ends and said dogs having lugs on their outer margins which project into the recesses, bolts screwed into said sections and extending through said lugs.

3. A coupling comprising, a housing formed of sections having thereon means for pivotally connecting and disconnecting said sections, said housing being shaped to fit around adjacent ends of pipe, or the like, and having inside, annular end grooves provided with recesses, series of plate-like arcuate dogs nested together in said grooves and whose inner margins are arranged to engage around said adjacent ends, the respective series of dogs converging inwardly, lugs on the dogs extended into the recesses and having bolt holes, bolts screwed into the housing and fitting loosely through said holes.

4. A coupling comprising, a housing formed of two sections having pivotal means thereon to connect and disconnect quickly said sections, said housing being shaped to fit around adjacent ends of pipe or the like and having inside, annular, end grooves provided with recesses and whose inner sides converge inwardly, nests of plate-like, arcuate, dogs in each groove, the dogs in each groove converging inwardly with respect to the dogs in the other groove, lugs on said dogs projecting into said recesses and having longitudinally aligned bolt holes therethrough and bolts extending through said bolt holes and screwed into the housing.

5. A coupling comprising, a housing formed of longitudinal sections pivoted together so as to form a single unit and shaped to fit around adjacent ends of pipe or the like and having inside, annular, end grooves provided with recesses and whose inner sides converge inwardly, nests of plate-like, arcuate, dogs in the grooves of each section and resting against said inwardly converging sides the dogs in each groove converging inwardly with respect to the dogs in the other groove, lugs on said dogs projecting into said recesses and means connecting the lugs loosely to the corresponding sections.

CRAWFORD K. STILLWAGON.

REFERENCES CITED

The following references are of record in the file of this patent:

UNITED STATES PATENTS

| Number | Name | Date |
|---|---|---|
| 1,123,635 | White | Jan. 5, 1915 |
| 1,930,194 | Dillon | Oct. 10, 1933 |
| 2,005,056 | Stephens | June 18, 1935 |
| 2,225,208 | Crickmer | Dec. 17, 1940 |
| 2,341,164 | Shimek | Feb. 8, 1944 |

FOREIGN PATENTS

| Number | Country | Date |
|---|---|---|
| 443,375 | Great Britain | Feb. 27, 1936 |